Sept. 6, 1966  R. J. HAMMOND  3,271,527
TRANSDUCER ELEMENT MOUNTING
Filed Nov. 23, 1962  3 Sheets-Sheet 1
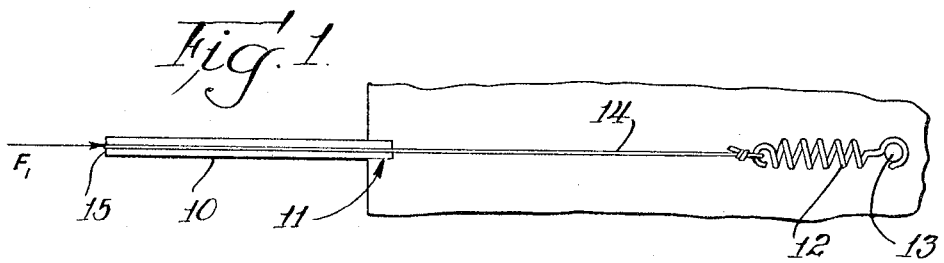
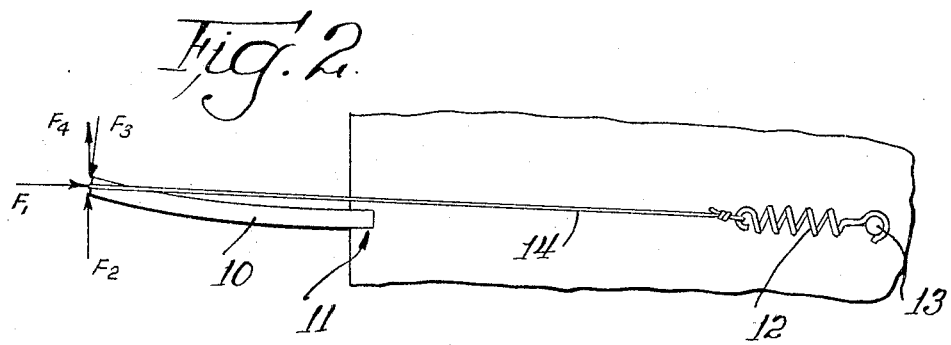
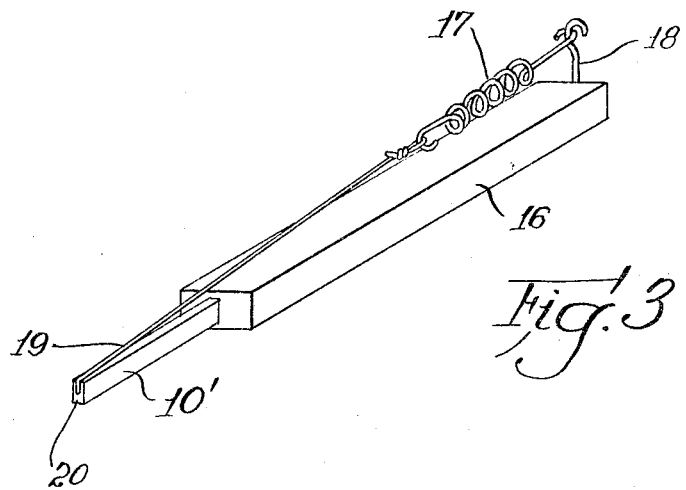
INVENTOR.
Robert J. Hammond
BY
Brown, Jackson, Boettcher & Dienner
att'ys.

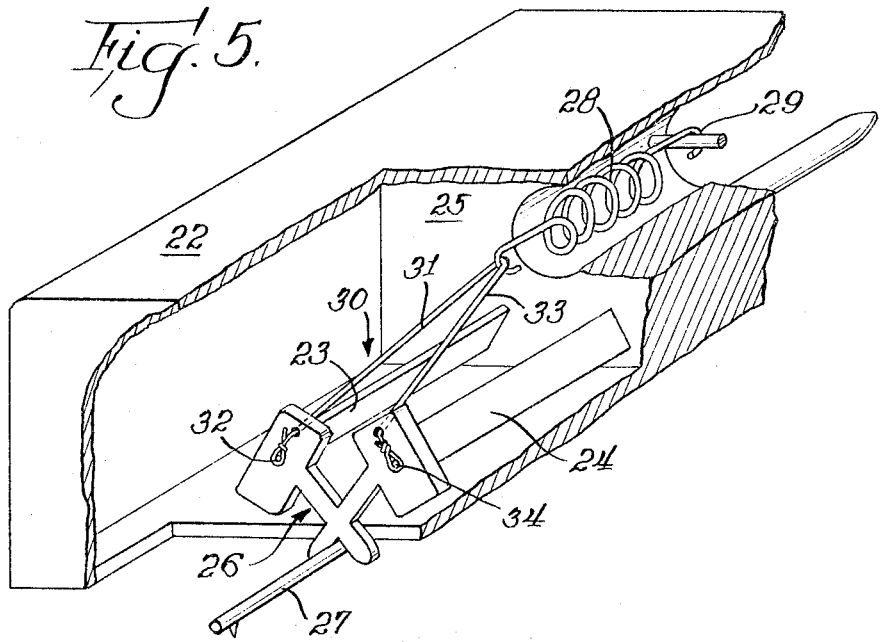
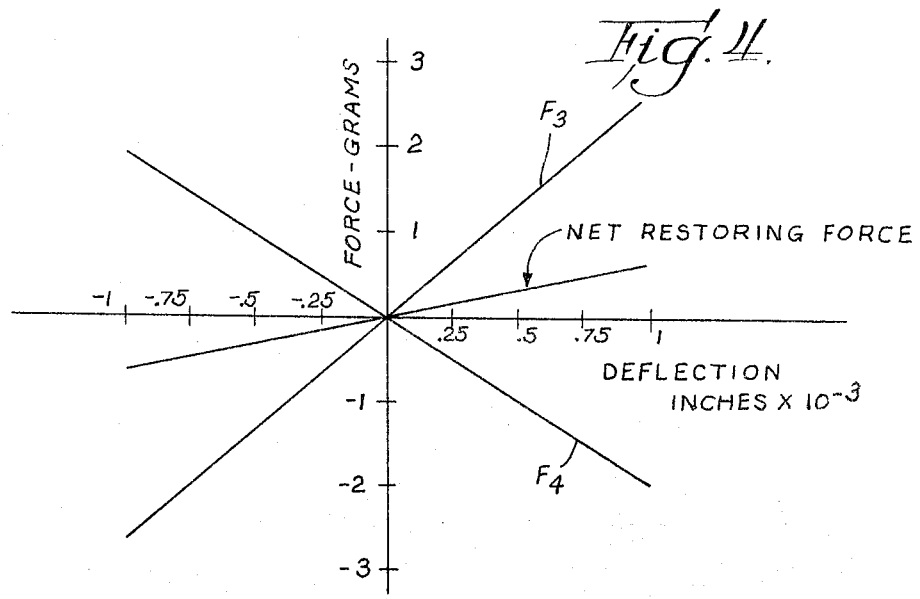

Sept. 6, 1966  R. J. HAMMOND  3,271,527
TRANSDUCER ELEMENT MOUNTING

Filed Nov. 23, 1962  3 Sheets-Sheet 3

INVENTOR.
Robert J. Hammond
BY
Brown, Jackson, Boettcher & Dienner
Att'ys.

United States Patent Office 3,271,527
Patented Sept. 6, 1966

3,271,527
TRANSDUCER ELEMENT MOUNTING
Robert J. Hammond, Stevensville, Mich., assignor to V-M Corporation, Benton Harbor, Mich., a corporation of Michigan
Filed Nov. 23, 1962, Ser. No. 239,542
9 Claims. (Cl. 179—100.41)

The present invention relates to an improved transducer mounting arrangement for use in ceramic or crystal cartridges or the like of the type where the compliance of a piezoelectric bender element is critical.

This invention is concerned particularly with transducers of the type comprising a piezoelectric bender element which is mounted in cantilever fashion and driven at its free end by a mechanical force whereby the transducer generates an output voltage proportional to the amplitude of the driving force. Such bender elements are of course well known in the art and are commonly employed in phonograph cartridges where they are associated with a yoke or other motion transmitting coupling member which cooperates with a stylus, whereby as the stylus tracks in the groove of a phonograph record, the motions imparted to the stylus are transmitted to the piezoelectric bender element.

It has been found desirable to design piezoelectric bender elements so that they are relatively flexible or compliant, since it is then possible to drive the free end of the bender element with less force. A reduction in the required driving force will permit a reduction in the pressure between the stylus and a record groove and thereby provide reduced record wear, reduced distortion, and improved tracking of the stylus in the record groove.

A typical piezoelectric bender element comprises five layers which when combined together produce a total thickness of approximately 0.020 inch. As stated above, such elements are cantilever mounted, whereby the deflection $f$ at the free end of the element, when acted upon by a transverse force $W$, will be determined by the formula $$f = \frac{Wl^3}{3EI}$$

where $I$ for a rectangle is determined by the formula $$I = \frac{bh^3}{12}$$

In other words, the compliance of the bender element, that is, the deflection at its free end for a given transverse end load, is inversely proportional to the cube of its thickness $h$ and it is therefore desirable to reduce the thickness of such elements as much as possible. However, piezoelectric bender elements are presently being made as thin as is practical according to known manufacturing methods, and it is therefore not feasible at this time to provide an appreciable increase in the compliance of such elements by further reducing their thickness.

It will be noted from the foregoing formula that the compliance of a cantilever mounted bender element is directly proportional to the cube of its length $l$, and thus a substantial increase in compliance could be achieved by increasing the length of such elements. However, there are several reasons why it is not considered desirable to substantially increase the length of the bender elements. First, because such elements are quite expensive, any substantial increase in the length and mass of the elements would result in a significant increase in their cost. Furthermore, it is known that the resonant frequency of a piezoelectric bender element is inversely proportional to the square of its length, and therefore a substantially longer element would have poorer high frequency response. For the foregoing reasons, an increase in the length of conventional piezoelectric bender elements is considered undesirable, and in fact one of the principal advantages of the present invention is that it permits a reduction in the length of such elements.

A principal object of the present invention is to provide an improved transducer element mounting which will substantially increase the compliance of the element while permitting the use of more desirable element configurations, such as elements of reduced length, so as to reduce cost and provide improved high frequency response.

In furtherance of the foregoing object, I provide a transducer comprising a cantilever mounted piezoelectric bender element in combination with means such as a spring for applying an external compressive force to the bender element whereby when the bender element is driven by forces imparted thereto from an associated stylus member, such forces will be supplemented by a lateral component of the externally applied spring force to in effect increase the compliance of the bender element.

Accordingly, a more specific object of the present invention is to provide a new and useful transducer mounting arrangement wherein the inherent stiffness of the element to lateral deflection is partially offset by loading the element in compression as by a suitable spring force, whereby upon an initial deflection of the free end of the element, a lateral component of the compressive force will be produced which will assist in the further deflection of the element in whichever lateral direction it is being driven.

Other advantages and uses of my invention will be apparent, or become so, as I described my invention in greater detail in conjunction with the accompanying drawings in which:

FIGURE 1 is a schematic view showing a transducer element mounted in cantilever fashion and loaded in compression by means of an externally applied spring force in accordance with the present inventive teaching;

FIGURE 2 is a view similar to FIGURE 1 showing the forces acting on the transducer element when the latter is laterally deflected as when embodied in a phonograph cartridge and driven by an associated stylus;

FIGURE 3 is a perspective view of an experimental unit of the type utilized for test purpose during the development of the present invention;

FIGURE 4 is a typical plot of force values versus deflection values which was established through tests carried out with the experimental unit of FIGURE 3;

Figure 6:
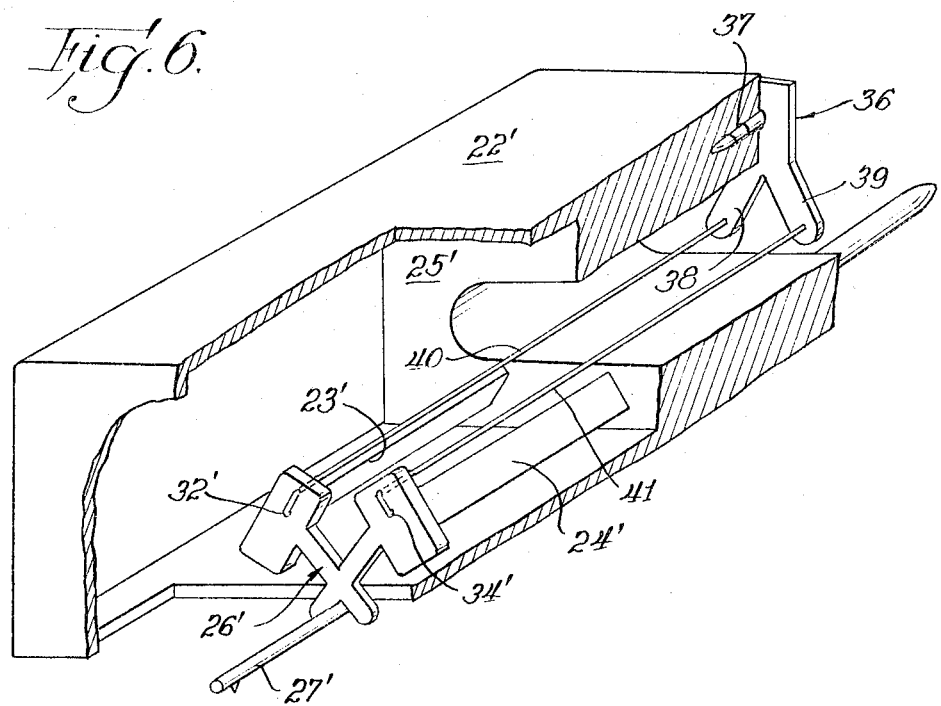

FIGURE 5 is a fragmentary perspective view of a phonograph tone arm-pickup assembly having a pair of transducer elements mounted therein and spring loaded in acordance with the present invention, the tone arm housing being partly cut away for purposes of illustration; and FIGURE 6 is a fragmentary perspective view similar to FIGURE 5 but showing an alternative form of the invention wherein a double-armed leaf spring has separate tension lines secured thereto and to the free ends of the elements in order to apply a compressive load to the latter.

Referring now to the drawings, FIGURE 1 shows a conventional piezoelectric element 10, such as a barium titanate "Bimorph" bender element, with one end fixedly mounted as at 11 and with its free end adapted to be driven transversely back and forth (up and down as viewed in FIGURE 1) by an associated stylus as the latter tracks in the groove of a record to be reproduced. A tension spring 12 has one end anchored to a fixed pin 13 and its other end connected to a length of music wire or thread or the like 14, the other end of the wire being secured to the free end of the element 10 as at 15. An arrow $F_1$ has been applied to the drawing to represent the compressive force produced in the element 10 by the tension spring 12.

FIGURE 2 shows the element 10 of FIGURE 1 as deflected by a transverse force $F_2$ applied at its free end, the force $F_2$ being representative of a driving force imparted to the element from an associated stylus (not shown). It will be understood that as the free end of the element is deflected laterally under the influence of the driving force $F_2$, the direction of the compressive force $F_1$ will no longer be along the axis of the element 10, and the spring force $F_1$ will therefore produce a force component which is transverse to the element, such transverse force component being identified as $F_4$ in FIGURE 2.

An arrow $F_3$ in the drawing is applied to represent the restoring force produced by the resilience or stiffness of the element 10, and it will be understood that for a given deflection of the element 10 the restoring force $F_3$ will equal the total of the transverse external forces applied to the free end of the element, i.e. $F_3 = F_2 + F_4$.

It is of course necessary that $F_3$ exceed $F_4$ at all times, since otherwise the element 10 would be unstable and would buckle. On the other hand, it is preferable that $F_4$ not be substantially less than $F_3$, since $F_3 - F_4$ equals $F_2$ which is the force which must be produced by the associated stylus in order to drive the transducer element, and it is desirable that the effective compliance of the bender element be small so that it can be driven by a relative small driving force. Such an arrangement permits reduced needle pressure, reduced wear, less distortion, and better tracking of the stylus in a record groove.

FIGURE 3 shows in somewhat schematic form an experimental test unit comprising a transducer element 10' which has one end fixedly mounted in a rigid block 16, and which is subjected to a compressive load of approximately 750 grams by means of a tension spring 17. The spring 17 is anchored to a fixed pin 18 at the far right hand end of the block 16, and is connected by means of music wire or the like 19 to the free end of the element 10' at 20.

The length of the element 10' is approximately 7/16 inch, whereas the length of the block 16 is approximately 7/8 inch. It will thus be seen that as the element is deflected transversely, the spring 17 will pivot about the far right hand end of the block 16 where the bracket end 20 is connected thereto. By mounting the spring so that it will pivot about a point considerably behind the fixed end or pivot point of the element, the lateral force components produced by the spring during driving of the element will be approximately linear.

FIGURE 4 is a graph showing certain of the results obtained from the test unit of FIGURE 3, and it comprises a plot of force values versus deflection values, the force being a transverse force at the free end of the element 10', and the deflection being the deflection of the free end of the element. The line identified as $F_3$ represents the total restoring force produced by the stiffness of the bender element at any given deflection. As in all linear transducer designs, the actual displacements were kept low enough so that the restoring forces were essentially linear over the range involved. The line identified as $F_4$ represents the transverse component of the force produced by the tension spring 17, and this line is drawn to indicate negative force values to show that the transverse component of the spring force opposes the restoring force $F_3$. Accordingly, the third line represents the net restoring force which equals $F_3 - F_4$. The line identified as "net restoring force" represents the effective deflection curve for the element, and it indicates the magnitude of the transverse force $F_2$ which must be imparted to the element from an associated stylus or the like in order to drive the element.

It will be seen from FIGURE 4 that the net restoring force or the force required to drive the element 10' is substantially less than the total restoring force $F_3$ which is the force which would have to be imparted to the element from the stylus in the absence of the tension spring 17. Thus, the presence of the spring force substantially increases the effective compliance of the element without requiring a reduction in its thickness or an increase in the length thereof. Referring to the test unit of FIGURE 3, the compliance of the element 10' was found to be $1.0 \times 10^{-6}$ cm./dyne, whereas the effective compliance of the element in combination with the spring was found to be $2.9 \times 10^{-6}$ cm./dyne. Obviously, it is possible with the present invention to make the net restoring force $F_3 - F_4$ quite small.

Because of the fact that application of an external spring force in accordance with the present invention can be utilized to offset the inherent stiffness of the bender element, it is an advantage of the present invention that it permits the use of bender elements which are shorter than those heretofore used. Thus, conventional piezoelectric bender elements normally are of a length of between 1/2 inch and 11/16 inch, whereas in conjunction with the present invention it is practical to use elements of a length of between 1/4 inch to 3/8 inch, and still provide the desired effective compliance of the element. The use of such shorter elements will result in a proportional reduction in the relatively high cost of the element itself, and will also produce improved high frequency response.

Referring again to FIGURE 3, it will be noted that the pivot point for the spring 17 is approximately 7/8 inch (which is the length of block 16) behind the pivot point for the element 10', and during driving of the element such an arrangement produces a lateral force component $F_4$ which is substantially linear as shown in FIGURE 4. It will further be seen that because the spring 17 is not in alignment with the axis of the element 10', it will produce a moment tending to bend the element, even when the latter is not being driven. However, it is important to understand that the spring is disposed substantially in the plane of the element so that the moment will not tend to bend the element in the direction in which it is driven, and thus it will have no effect on the operation of the bender element. In addition, experimentation has shown that misalignment in construction will result only in a displaced stability point for the element and will have no significant effect on its operation. Thus, the precise location of the spring is not critical, although it is preferable that the effective mass of the spring be small in relation to the mass of the element.

FIGURE 5 shows a portion of a phonograph tone arm 22 having a stereophonic cartridge comprising a pair of piezoelectric bender elements 23 and 24 arranged in conventional fashion with one end of each fixed in a mounting member 25, and with their free ends associated with a yoke or coupling member 26 for transmitting motions from a stylus arm 27 to the respective elements. In accordance with the invention, a tension spring 28 has one end anchored to a pin 29 which is fixed to the tone arm, and its other end connected to a length of music wire or other suitable connecting means 30. The wire 30 has one end 31 which is connected to the driving point or forward end of the element 23 at 32, and a second end 33 which is connected to the driving point of the element 24 at 34.

As in the test unit of FIGURE 3, the embodiment of FIGURE 5 is arranged so that the tension spring 28 is approximately in the plane of the elements 23 and 24, that is, disposed approximately on the line of intersection of the planes formed by the two elements. In this manner, when the elements are not being driven, the moment produced by the spring will not tend to bend the elements in the drive direction. However, as stated above, such alignment is not critical.

FIGURE 6 shows an alternative embodiment of the phonograph tone arm and stereophonic cartridge of FIGURE 5, and like elements are identified therein by corresponding primed numerals. In this instance, a leaf spring 36 is fixedly secured to the tone arm housing at 37, and the spring 36 has a pair of downwardly extending arms 38 and 39 which comprise flexible spring arms. It will be seen that separate tension lines are provided comprising a first length 40 of music wire extending from the spring arm 38 to the driving point or foreward end 32' of the element 23', and a second length 41 of wire or the like extending from the spring arm 39 to the forward end 34' of the element 24'. The arms 38 and 39 are so positioned that the wires 40 and 21 are substantially in the planes of the respective elements to which they are secured, and they exert a pull upon the lines 40 and 41 to maintain a compressive load on the elements 23' and 24'.

It will now be understood that the present invention provides a highly advantageous mounting arrangement for substantially increasing the natural compliance of a piezoelectric bender element. The present invention is particularly useful in the manufacture of phonograph cartridges. However, it is not limited to such use, and is adapted for various applications in conjunction with ceramic or crystal cartridges where the compliance of a bender element is critical.

While the particular embodiments of my invention as described herein show a tension spring and a leaf spring for applying a compressive force to a bender element, it will be recognized that a variety of spring constructions and placements may be utilized without departing from the spirit of the invention. Therefore, while I have illustrated my invention in a preferred form, I do not intend to be limited to that form, except insofar as the appended claims are so limited, since modifications coming within the scope of my invention will be readily suggested to others with my disclosure before them.

I claim:
1. A transducer element assembly comprising, in combination, a bender element mounted in cantilever fashion so as to be adapted to be driven in a transverse direction at its free end to generate an output voltage proportional to the amplitude of the driving force, and means applying a compressive force to said bender element such as to increase its effective lateral compliance and thereby reduce the transverse force required to drive the same.

2. A transducer element assembly comprising, in combination, a bender element mounted in cantilever fashion so as to be adapted to be driven in a transverse direction at its free end to generate an output voltage proportional to the amplitude of the driving force, and spring means applying a compressive force to said bender element perpendicularly to the transverse driving force to increase its effective lateral compliance and thereby reduce the transverse force required to drive the same.

3. A transducer element assembly comprising, in combination, a bender element mounted in cantilever fashion so as to be adapted to be driven in a transverse direction at its free end to generate an output voltage proportional to the amplitude of the driving force, and a tension spring operatively connected to apply a compressive force at the free end of said bender element perpendicularly to the transverse driving force to increase its effective lateral compliance and thereby reduce the transverse force required to drive the same.

4. A transducer element assembly comprising, in combination, a bender element mounted in cantilever fashion so as to be adapted to be driven in a transverse direction at its free end to generate an output voltage proportional to the amplitude of the driving force, and a tension spring anchored at one end so as to be adapted to pivot about a point substantially rearwardly of the fixed end of said bender element and associated with said bender element so as to be adapted to apply a compressive spring force at the free end thereof thereby to increase the effective lateral compliance of said bender element and reduce the transverse force required to drive the same.

5. A transducer element assembly comprising, in combination, a bender element mounted in cantilever fashion so as to be adapted to be driven in a transverse direction at its free end to generate an output voltage proportional to the amplitude of the driving force, and a tension spring anchored at one end so as to be adapted to pivot about a point substantially rearwardly of the fixed end of said bender element and associated with said bender element so as to be adapted to apply a compressive spring force at the free end thereof, thereby to increase the effective lateral compliance of said bender element and reduce the transverse force required to drive the same, said tension spring being disposed approximately in the plane of said bender element when the latter is in its undeflected position.

6. The invention of claim 5 wherein the effective pivot points of said bender element and said spring are in substantial alignment with the free end of said bender element at the point of application of the applied compressive force when the bender element is in its undeflected position.

7. In a phonograph cartridge, in combination, at least one piezoelectric bender element mounted in cantilever fashion so as to be adapted to be driven in a transverse direction at its free end by coupling means coupled to an associated stylus arm to generate an output voltage proportional to the amplitude of the driving force, and spring means applying a compressive force to said bender element perpendicularly to the transverse driving force to increase the effective lateral compliance of said bender element and thereby reduce the force required to be transmitted from said stylus arm to drive said bender element.

8. In a phonograph cartridge, in combination, at least one piezoelectric bender element mounted in cantilever fashion so as to be adapted to be driven in a transverse direction at its free end by coupling means coupled to an associated stylus arm to generate an output voltage proportional to the amplitude of the driving force, and a leaf spring mounted rearwardly of the fixed end of said bender element and connected to the free end thereby by connecting means applying a compressive force to said bender element to increase its effective lateral compliance and thereby reduce the force required to be transmitted from said sylus arm to drive said bender element.

9. In a phonograph cartridge, in combination, at least one piezoelectric bender element mounted in cantilever fashion so as to be adapted to be driven in a transverse direction at its free end by coupling means coupled to an associated stylus arm to generate an output voltage proportional to the amplitude of the driving force, and spring means comprising a tension spring anchored at one end so as to be adapted to pivot about a point substantially rearwardly of the fixed end of said bender element and associated with said bender element so as to be adapted to apply a compressive force to said bender element at the free end thereof to increase its effective lateral compliance and thereby reduce the force required to be transmitted from said stylus arm to drive said bender element.

References Cited by the Examiner
UNITED STATES PATENTS
1,980,888  11/1931  Thomas _____ 179—110

BERNARD KONICK, Primary Examiner.

IRVING L. SRAGOW, Examiner.

J. F. BREIMAYER, Assistant Examiner.